Aug. 30, 1927.
F. V. ANDERSON
PRESS OR EXPELLER
Filed Sept. 26, 1919
1,640,342
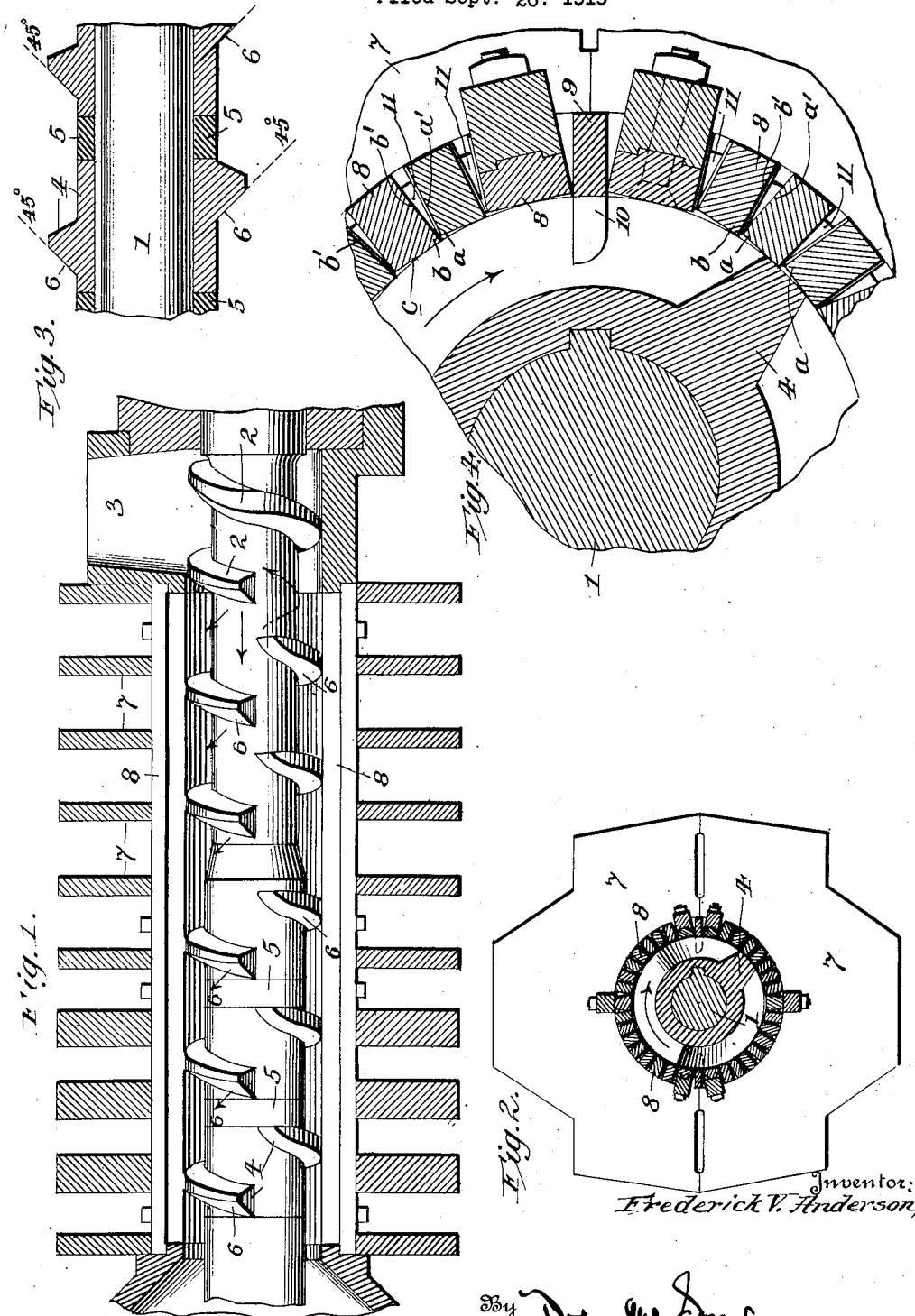
Inventor:
Frederick V. Anderson,
By Dodge and Sons,
Attorneys.

Patented Aug. 30, 1927.

1,640,342

UNITED STATES PATENT OFFICE.

FREDERICK V. ANDERSON, OF CLEVELAND, OHIO, ASSIGNOR TO THE V. D. ANDERSON COMPANY, OF CLEVELAND, OHIO, A CORPORATION OF OHIO.

PRESS OR EXPELLER.

Application filed September 26, 1919. Serial No. 326,612.

This invention pertains to improvements in expellers or presses, and more particularly to the screw construction thereof, and has for its main object the production of a screw or worm which by reason of its construction will more effectively act upon the material than the screws now commonly employed in connection with presses of the same general type.

A further object is to produce a screw or worm which is stronger than the old type in that the new construction admits of the screw being evenly hardened or tempered, or substantially so, throughout.

The press is of the type shown and claimed in Letters Patent No. 829,314 and No. 829,315, dated August 21, 1906, though of course the invention is applicable to other types and forms. The press in so far as is necessary to an understanding of the present invention, is illustrated in the annexed drawing, wherein:

Figure 1 is a longitudinal sectional view of the press, or more specifically, the worm and screw construction;

Figure 2, a transverse vertical section thereof on a somewhat reduced scale;

Figure 3, a sectional elevation of a portion of the screw and its operating shaft; and Figure 4, an enlarged detail cross sectional view of a portion of the press shell, the screw and its shaft.

In the drawings, 1 denotes the operating or driven shaft of the press having at its forward end an interrupted feed and initial expressing screws or worms 2 which draw the material to be acted upon inwardly from the feed hopper 3 to the final expressing worms or screws 4. Said screws 4 are separated, as by collars or spacing rings 5, and exert great pressure upon the material undergoing treatment, at the same time feeding or forcing the same through the press to and out of the discharge end of the same. The screws rotate in the direction of the arrow in Figs. 2 and 4.

Heretofore, so far as I am aware, the forward or advancing faces, as 6, of the screws have been formed so that they stood at an angle inclined but slightly to the rear, or in other words inclined rearwardly to a slight extent only from a plane extending transversely at right angles to the axis of the screw. I have found that by making this angle greater, or arranging it at substantially 45° to the axis of the screw, a better pressing action is produced, and that, furthermore, the screws or worms may be more evenly hardened. Under the present construction the angle formed at the junction of the screw flight with the body from which it extends is greater or more obtuse than under the former construction, and as a consequence the liquid used to temper or harden the screw is not driven away or excluded from the angle. The screw may thus be hardened more evenly throughout, and a defect which existed under the old form is remedied.

Furthermore, by giving the working face of the screw such greater rearward inclination a more extended wearing surface or superficial area is provided. Again, the present form tends to force the material undergoing treatment outwardly toward the inner wall of the shell or barrel instead of more nearly in a line or direction parallel to the axis of the press. This latter point is of material advantage, and particularly so with a press shell or barrel of the form shown in the drawings and now to be described.

Inasmuch as the shell or barrel is subjected to a high degree of internal pressure it is essential that it be strongly constructed. It may be said to comprise a series of spaced ribs or frame members 7 and a plurality of longitudinally extending bars 8. Bars 9 carrying knives 10 may be employed. Bars 8 are spaced apart by suitable means, as inclined rivet heads 11, the inner edges of the bars standing quite close together and leaving small openings or slots through which the liquid (oil, juice, moisture, etc.) may pass.

In expressing oil it has been found that the foots will to a greater or less extent pass out with the oil through the openings between the bars, and to prevent this the interior of the barrel is so shaped as to present a stepped surface, that is, one in which there is formed a series of angles with the drainage openings extending from the apexes of the angles. In the construction illustrated this stepped effect is produced by so shaping and positioning the bars, as best seen in Fig. 4, that the forward edge *a* of each bar, having reference to the oncoming or thrust face 6 of the screw, lies slightly below the adjacent rear edge *b* of the immediately preceding bar. In other words, one side face as b' of each bar, projects inwardly and extends beyond the immediate adjacent side face a' of the next bar in the series, such inwardly projecting portion of the side face b' forming an angle with the inner face c of the next succeeding bar. There is thus formed a barrel the interior face whereof may be said to have a stepped construction, or a barrel the inner face of which is composed of or presents a series of substantially flat faces which lie in different angular planes, with the forward edge of each bar standing at a greater distance from the axis of the press than the rear edge.

With a shell thus constructed and a worm or screw having its working or advancing face lying in a plane at substantially 45° to a plane passing at right angles through the axis of the worm, a highly efficient result is obtained. The worms tend not only to force the material forward but also outwardly at substantially right angles to the working face of the screw into contact with the shell, and as a result great frictional resistance is set up with consequent higher extraction. Less fine foots and meal are lost through the drainage slots than with the older construction.

No claim is made herein either generically or specifically, to the conformation of the shell or barrel as above set forth, as the same is set forth and claimed in my co-pending application Serial No. 219,837, filed March 1, 1918, now patent 1,321,273, dated November 11, 1919.

Having thus described my invention what I claim is:—

1. In a press, the combination of a shell of substantially the same internal diameter throughout its length having drainage openings extending through the walls thereof; and a plurality of worms mounted for rotation in the shell, the forward or advancing faces whereof are inclined rearwardly at an angle of approximately 45°.

2. In a press, the combination of a shell having drainage openings extending through the walls thereof; and a series of spaced worms mounted for rotation in the shell, the forward or advancing faces of the worms inclining rearwardly toward their outer edges at an angle of approximately 45°.

3. In a press, the combination of a worm the advancing face whereof inclines rearwardly toward its outer edge at an angle of approximately 45°; and a barrel surrounding the screw, said barrel being formed from a series of spaced bars with the forward edge of each bar, upon the interior of the barrel, and with reference to the advancing or thrust face of the worm, lying below the adjacent edge of the adjoining bar.

4. As a new article of manufacture, a worm for expressing presses, comprising a hollow body member with a flight extending thereabout, the forward or advancing face whereof inclines rearwardly toward its outer edge at an angle of approximately 45°.

5. In a press, the combination of a barrel composed of a plurality of spaced bars extending longitudinally of the press, the inner faces of the bars presenting a stepped formation; and a plurality of worms mounted for rotation in said barrel, the advancing faces of such worms being inclined rearwardly at an angle of substantially 45°, whereby the material passing through the press is forced outwardly into contact with the inner stepped face of the barrel as well as being forced forwardly through the press.

6. In a press, the combination of a worm, the advancing face whereof inclines rearwardly at an angle of substantially 45°; and a barrel surrounding the worm, said barrel being formed from a series of spaced bars with the forward edge of each bar, upon the interior of the barrel, and with reference to the advancing or thrust face of the worm, lying below the adjacent edge of the adjoining bar.

In testimony whereof I have signed my name to this specification.

FREDERICK V. ANDERSON.